United States Patent [19]

Neilson et al.

[11] 4,136,586
[45] Jan. 30, 1979

[54] METHOD FOR CONSTRUCTING A MULTIPLE SEGMENT ROCK BIT

[75] Inventors: William J. Neilson, Whittier; Dwight A. Rife, Mission Viejo, both of Calif.

[73] Assignee: Smith International, Inc., Newport Beach, Calif.

[21] Appl. No.: 842,614

[22] Filed: Oct. 17, 1977

[51] Int. Cl.² ............................................. B21K 5/02
[52] U.S. Cl. .................................... 76/108 A; 29/404
[58] Field of Search ............. 76/108 A, 108 R, 101 R; 29/404, DIG. 26

[56] References Cited

U.S. PATENT DOCUMENTS

| | | | |
|---|---|---|---|
| 2,118,317 | 5/1938 | Mader | 29/404 |
| 3,907,191 | 9/1975 | Lichte | 76/108 A |
| 3,952,460 | 4/1976 | Clements | 29/404 |

Primary Examiner—Al Lawrence Smith
Assistant Examiner—Roscoe V. Parker
Attorney, Agent, or Firm—Christie, Parker & Hale

[57] ABSTRACT

The cone cutter of each segment of a multi-segment rock bit is assembled onto its segment. A pin end of the segment is supported by an index pin and axially constrained in the direction away from the cone cutter. The cone cutter is clamped against and dimensionally indexed on a cone saddle having a circular surface of a diameter corresponding to the gage diameter of the completed rock bit. The cone is loaded in a direction axially of the segment in a manner to simulate the loading of the hole bottom that is to be drilled by the rock bit. The segment away from the cone is also loaded radially of the axis of the segment to take up tolerances along the axis of rotation of the cone cutter. The constraint of the cone and loading of the segment simulate the hole wall force on the cone experienced at the gage row and takes up tolerances radially of the axis of rotation of the cone along a line to the gage row in contact with formation material. A bridge prevents rotation of the segment about its lengthwise axis. With the setting of all constraints, a clamp at the pin end of the segment locks the segment in place and the bridge is removed. The included angle between faying surfaces of the segment is then finished. Thereafter, enough finished segments to make a complete rock bit are assembled and welded together along their faying surfaces. The action of axial and radial loading of the cone in a manner to simulate drilling loading prior to finishing the segments assures that the cone axis, offset, and gage diameter are all proper in an assembled rock bit.

17 Claims, 5 Drawing Figures

METHOD FOR CONSTRUCTING A MULTIPLE SEGMENT ROCK BIT

BACKGROUND OF THE INVENTION

The present invention relates in general to the art of rock bits used in drilling petroleum wells and the like, and, more particular, to a multi-cone rock bit and a method of its assembly that assures highly accurate gage diameter, cone axis angle, and cone axis offset.

Multiple-cone rock bits, typically three-cone, are well known and commonly used in the petroleum industry for drilling wells. These rock bits are attached at the end of a drill string and rotate with the drill string. Cutter cones of the rock bit penetrate rock by crushing, cutting, gouging and scraping the rock. The cones work on the bottom wall of the hole and the side walls of the hole. The cones mount on journals for rotation. The axis of each cone inclines at an acute angle to the rotational axis of the rock bit. It is preferred practice to have the axis of the cones offset from the axis of the rock bit. Offset is the distance the axis of each cone is from the axis of rotation of the rock bit at the closest approach of the two axes. Offset produces wall gouging at the base of the hole by the cone dragging across this wall as well as rotating over it.

It has been the practice to form rock bits in segments. In a three-cone rock bit three segments are used. Each segment has a cone. A pin end of the segment is threaded for attachment to a drill string. The segments are joined together by welding at longitudinal faying surfaces at the pin end of the rock bit.

The cutter cones of rock bits have teeth or inserts that mesh with elements of or are received in recesses of adjacent cones so that the entire hole bottom faced by the cones experience the penetrating action of the teeth. This requires accurate alignment of the cones so that they do not interfere with each other during rotation.

The diameter of a hole produced by a rock bit is called the gage diameter. This diameter must be held to close tolerance. If the diameter is too small, it may not be possible to install casing in the hole without enlarging it, and this enlargement of course requires time and expense. In some applications the bit must pass through casings with a minimum diameter. An over-sized bit would interfere with the wall of the casing. In other operations it is necessary for a bit to pass through an already fabricated well bore to get to the area being drilled. It is obviously highly desirable to pass the bit through the preformed hole without encountering the bore wall.

Heat treating and machining develop dimensional part-to-part variations that cannot be controlled sufficiently so that the segments of a rock bit go together without adjustment. There has been resulting difficulty in maintaining gage diameter, journal angle, and offset within required tolerances. At least in some cases, the assembly of rock bits has developed into an art. In the usual method, each segment is completely finished. The segments are then preliminarily assembled and the gage diameter of the assembly determined by a guage ring. The assembler can shim between the faying surfaces to increase the gage diameter. Alternatively, a modest amount of scissoring or skewing of the segments with respect to each other can effect changes in gage diameter. Sometimes both techniques are employed. After acceptable gage diameter has been achieved, the segments are welded together.

SUMMARY OF THE INVENTION

The present invention provides a method for assembling a multiple segment rock bit that eliminates or reduces the requirements for cut and try in determining proper tolerances of the completed rock bit by accounting for tolerances between the cones and the segments, and only then finishing the faying surfaces. The taking up of these tolerances prior to finishing the faying surfaces compensates for deviations in the dimensions of the segments produced by such agencies as machining tolerances and heat treatment.

A particular form of the present invention contemplates the assembly of each cone and its associated segment of a multiple segment rock bit. Each such assembly is then supported at the pin end of the segment. Preferably such support permits pivotal movement of the segment on the support and rotation of the segment about the support, the amount of such movements in practice being small. The movements correspond to pitch, yaw, and rotation. A force acts radially of the axis of the cone cutter on the cone cutter at its gage point to constrain the cone and locate its gage point at the gage diameter of the bit. Location is with reference to a certain datum, say the bed of a fixture to which the segment is ultimately clamped. The radial force can be a component of the reaction force to the weight of the cone cutter and may be applied by a cone saddle that has a surface with a radius of curvature corresponding to the radius of curvature of the desired gage diameter, and spaced a known distance from the datum and in proper relationship to the datum and the pin end support to establish the linear distances at the pin end and cone end of the segment with respect to the datum. Forces applied to the cone cutter and the segment, preferably to the segment on its leg adjacent to the cone cutter and axially of a journal for the cutter, takeup tolerances axial of the journal between the cone cutter and the balance of the segment. Preferably this is done by a slide having a head that engages the cone and applies a load axially of the segment and the cone in the manner that the bottom wall of a hole would do. Preferably this axial load is reacted by a block bearing on the segment at the pin end thereof. The assembly of the cone and segment are laterally loaded at the gage point to simulate the loading of a wall of the bore hole on the cutter as the rock bit rotates. This loading preferably attends the axial loading and gage point loading previously discussed. The angle of the segment is set relative to the reference datum, preferably by a bridge bearing on preliminarily formed faying surfaces of the segment. After these loads have been applied and positions established, the segment is locked firmly in place and the V-shaped faying surfaces of the segments finished to the required included angle and in correct relationship to the balance of the segment, which relationship can be determined with reference to a datum.

These and other features, aspects and advantages of the present invention will become more apparent from the following description, appended claims and drawings.

DESCRIPTION OF THE PREFERRED EMBODIMENTS

Figure 1:
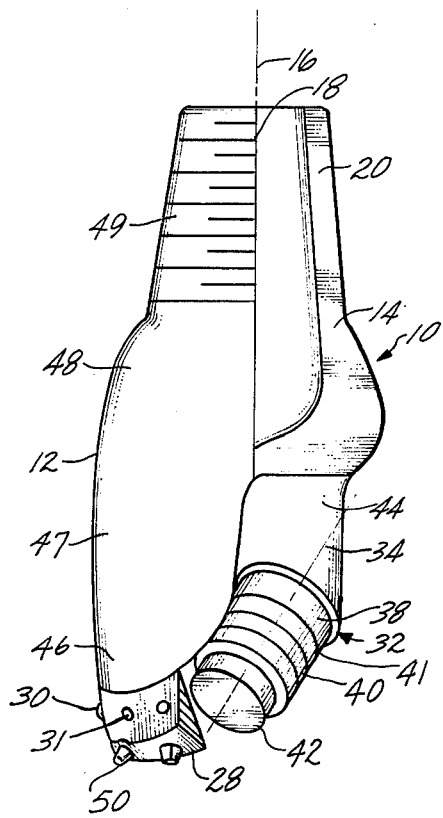
FIG. 1 illustrates in vertical elevation a typical three-cone rock bit with one of the three segments removed, the cone of a rear segment removed, and a portion of the cone of the remaining segment also removed.
Figure 2:
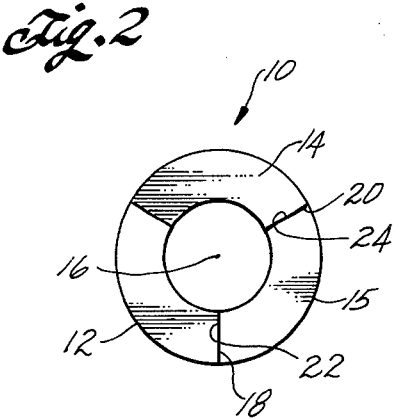
FIG. 2 illustrates the top view of the three-cone bit of FIG. 1.

FIGS. 1 and 2 illustrate a typical rock bit 10. The bit consists of three segments, two being shown in FIG. 1 at 12 and 14 and the third being shown with the other two at 15 in FIG. 2.

The segments are joined along three seams extending vertically and at 120° with respect to one another measured from the longitudinal axis of the rock bit, that axis being shown by reference numeral 16. The junction of segment 15 with segments 12 and 14 is illustrative and typical. Segment 12 has a faying surface 18, and segment 14 has a faying surface 20. Segment 15 has a faying surface 22 and a faying surface 24. Surfaces 18 and 22, and surfaces 20 and 24 mate. The segments join along these surfaces and in the joining process the surfaces disappear. The joints are welded. The relationship of the segments with respect to one another can be determined by the relationship of the mating faying surfaces. Perfectly matched surfaces would find the segments united within desired dimensional tolerances. Such an ideal state, however, is rarely achieved. For any of a number of reasons the mating of the faying surfaces more often than not produces a rock bit which without correction is outside tolerance. Examples of what can happen include the skewing or twisting of one segment with respect to its adjoining segments and longitudinal axis 16. This displacement can be viewed as a rotation of the segment about a center radially of axis 16. A second example includes pitching a segment with respect to axis 16 and the other segments. This pitching can be viewed as rotation or pivotal movement about an axis at right angles to the longitudinal centerline of the segment and to the longitudinal axis of the rock bit; such a line would fall roughly in the horizontal in FIG. 1. A third example would be the radial displacement of a segment inwardly or outwardly from its desired position and with respect to axis 16. Obviously, these factors can combine to produce an infinite variety of possible orientations of the segments with respect to each other.

The reasons for these variations include the buildup of machining tolerances and distortion from heat treatment.

It is fundamental, in the design of an acceptable rock bit, to hold gage diameter to within very close tolerances. For example, the American Petroleum Institute has established for a certain class of rock bits a tolerance of −0 + 0.031 inches. The gage diameter is the diameter of the hole that the rock bit develops in the rock formation being penetrated. It is at the maximum diameter with respect to the axis of the rock bit of each of the rotary cutters of the rock bit. Thus in FIG. 1, rotary cutter 28 has a maximum diameter with respect to axis 16 at 30. This diameter falls on a point tangent to a row of tungsten-carbide inserts 31. This row is known as the gage row and the point is known as the gage point.

Upwardly from this point a slight backdraft exists and this angle is called the gage angle.

Each cone cutter mounts for rotation on a journal of its associated segment. In FIG. 1, journal 32 of segment 14 mounts a cutter similar to cutter 28. The journal has an axis 34 which extends at an acute angle to axis 16 and does not intercept axis 16. The fact that the two axes do not intercept means that axis 34 is skewed with respect to axis 16. The skewing develops a dragging or gouging effect of the cutter carried by journal 32 on the formation being penetrated by the rock bit. The particular journal illustrated has a race 38 for roller bearings and a race 40 for ball bearings, the latter also serving to lock the cutter on the journal. A land 41 separates the races. A ball-loading hole passes from the posterior end of the journal into the race for loading balls after the cutter has been placed over the journal. A ball-retaining plug is inserted in this access hole and welded in place. A friction pin 42 at the anterior end of the journal supports a thrust button and mounts a friction bearing, neither of which is shown. A radially extending surface of the cutter bears on the thrust button to take thrust loads on the cutter.

With continued reference to FIG. 1, the journal is integral with a leg 44 of segment 14. The outer radial surface of the leg proximate the upper end of the cutter is known as a shirttail. For segment 12, its shirttail is shown at 46.

Figure 3:
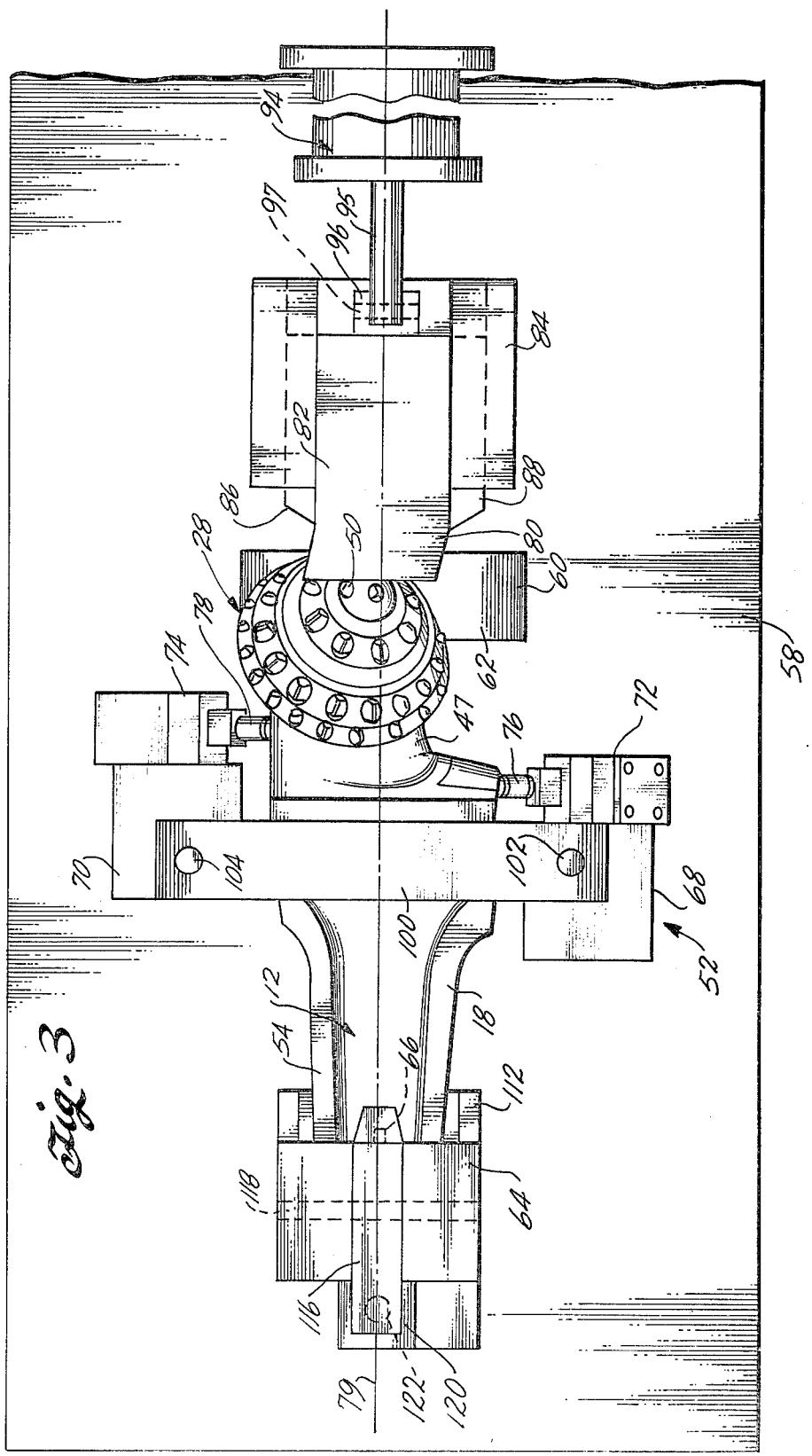
FIG. 3 illustrates in plan view an apparatus and segment in the practice of the method of the present invention.
Figure 4:
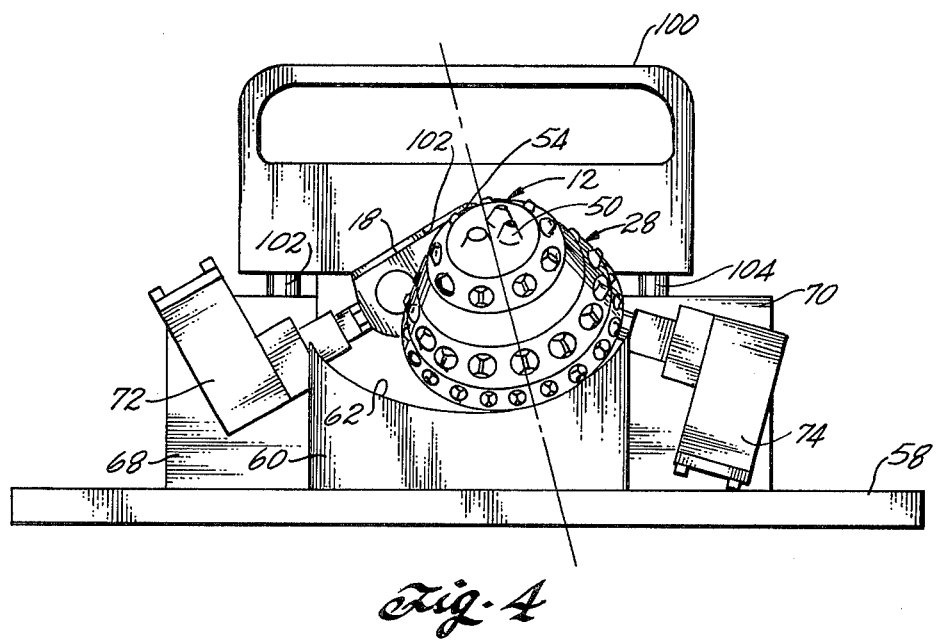
FIG. 4 illustrates in end elevational view the apparatus and segment of FIG. 3.

In multi-cone rock bits the cones face each other and mesh with each other so as to present to formation material a continuous attack at the bottom of a hole. In FIGS. 3 and 4 tungsten-carbide inserts 50 in cutter 28 mesh with complementary inserts and in annular recesses between adjacent rows of inserts in adjacent cutters. It is important, therefore, that the orientation of axis 34 with respect to the corresponding axis of the other journals be held to within close tolerances to avoid cutter contact with other cutters. A typical tolerance is plus or minus $\frac{1}{2}$°.

A third dimension which is important is the amount of offset of the journal axis. The offset is measured from the closest approach of the journal axis to the axis of the rock bit, and a typical tolerance is plus or minus 0.010 inches. If the offset is wrong, cutter interference and improper drag of the cutters on the surface of the hole being drilled can both result.

As can be seen in FIG. 1, segment 12 has a leg 47 that concludes in shirttail 46. A crown 48 caps this leg, and a pin end 49 caps the crown. Threads on the pin end enable the rock bit to couple into the lower end of a drill string.

With this background in mind, the dimensional tolerances of a rock bit are harmonized in accordance with the present invention by taking each segment and its cone cutter, and loading the cutter in a manner to simulate loading during the drilling of a hole. This loading takes up inter-segment tolerances between cone and cutter. With dimensions gauged from the gage row and pin end of a segment, the angular orientation of the segment set with respect to some reference, and the cutter loaded axially and laterally to simulate the loading experienced in the field, the segment is clamped in place and its faying surfaces machined to finish the 120° included angle between the surfaces.

With reference to FIG. 3, segment 12 of FIGS. 1 and 2 is shown in a fixture 52. Faying surface 18 and a complementary faying surface 54 face the viewer and have been roughly brought to a 120° included angle. The re-machining of these faying surfaces leaves sufficient material for removal later in the process. The space between the faying surfaces, shown at 56, ultimately becomes a part of a drilling mud passage or gallery. A bed 58 of the fixture provides an indexing datum. A cone saddle 60 extends from this base and has a surface 62 with a curvature on the gage diameter. This curvature can be seen in FIG. 4. A constraint block 64 mounted on the bed mounts an index pin 66. The pin end of the segment has a hole which receives the index pin. The block prevents axial movement of the segment in a direction away from the cutter. The segment mounts on the index pin of the block, with the cone lying on the surface of the cone saddle. At this point the pin end of the segment permits rotation, pitch and yaw. The segment also is preliminarily indexed in the vertical with respect to the bed. This indexing, when finished, is referenced in the faying surface finishing. Standards 68 and 70 extend upwardly from bed 58 to either side of the position of the segment. Jacks or actuators 72 and 74 attach to standards 68 and 70, respectively, and have extendable shafts 76 and 78, respectively, for applying force on the segment and to support the segment. The direction of action of the jacks is upward of bed 58 and radially inward of a reference axis 79 for the segment. Jack 74 acts on leg 47 of the segment near the journal for cutter cone 28. Support by these jacks permits the taking up of axial tolerance between the journal and the cutter cone, because the segment is forced towards the cone by the jacks, and the cone, forced towards the segment by a head 80 of a slide 82.

Figure 5:
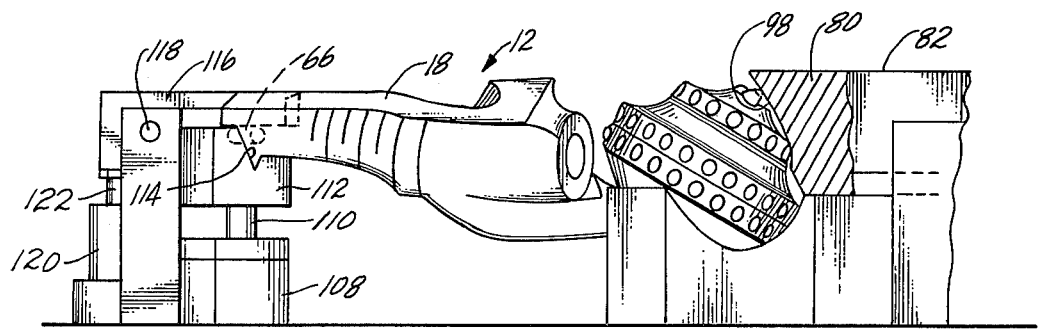
FIG. 5 illustrates in an elevational side and end view a portion of the apparatus and the segment previously illustrated.

Slide 82 mounts on ways 84 which in turn mount on bed 58. Slide 82 has a pair of opposed, laterally extending tongues 86 and 88 received in channel slots 90 and 92 of the ways to permit movement of the head along reference axis 79. The slide responds to an actuator 94 attached to the slide through a shaft 95 pinned in a clevis 96 of the slide by a pin 97. As can be seen in FIG. 5, head 80 of slide 82 has a face 98 that has a surface at right angles to axis 79 in horizontal planes but at an acute angle to the horizontal in vertical planes. This enables a force axially of the journal to be applied to the cone by the head, as well as a force normal to saddle surface 62 on the gage point of the cone in contact with that surface. The force component acting parallel to the axis of the cone forces the cone tightly down on the journal and takes up axial tolerance. The force acting normal to the surface of the saddle and at the gage point simulates hole side wall forces on the cutter and take-up tolerances in this direction radially of the journal axis.

With jacks 72 and 74 actuated, their shafts bear against opposite sides of the segment. With slide 82 acting on cone cutter 28 in opposition to the jacks, the cone is forced tightly down on the journal and against cone saddle 60. The cone cutter is then positioned with respect to the segment as it will be positioned in service. All tolerances have been taken out. The index pin on block 64 determines the elevation of the pin end of the segment. The saddle determines the elevation at the cutter end of the segment.

The angular alignment with respect to the fixture of the segment is by a V-block bridge 100. As can be seen in FIG. 4, bridge 100 has a 120° inverted V-slot 102 that indexes on the 120° pre-machined surface of the segment. The V-block mounts on standards 68 and 70 through upright shafts 104 and 106 and is capable of some vertical movement. Horizontal and rotational movements, however, are not possible because of the constraints of the vertical shafts. The capability of vertical movement accommodates elevational adjustments of the segment with respect to bed 58 occasioned by position gauging of the cutter by saddle 60, the segment leg by jacks 72 and 74, and the pin end by the index pin 66.

With the segment so positioned, it is finally clamped into place by a mechanism shown best in FIG. 5. There, an actuator 108 has a shaft 110 that carries a head 112. The head is a V-shaped slot 114. The pin end of the segment nests in this slot. A dog 116 pivots on block 64 through a pivot pin 118 received in a bore of the block and passing through the dog. An end of the dog lies in the drilling mud gallery of the segment. An actuator 120 has a shaft 122 capable of acting on the bottom end of the dog remote from the V-slotted head. Actuation of actuator 108 brings head 112 against the pin end of the segment and forces the pin end tightly against index pin 66. When actuator 120 is actuated, the dog rotates to bring its head into contact with the pin end of the segment to securely clamp the pin end of the segment against the V-slotted head.

The constraint on the segment's freedom of movement becomes total when the following forces act on the segment: opposed forces parallel to reference axis 79 applied by slide 82 and block 64; opposed forces acting radially of surface 62 of saddle 60 on the gage point of cutter 28 applied by the saddle and slide 82; opposed forces applied parallel to the axis of the journal for cutter 28 between the cutter and the leg of the segment applied by slide 82 and actuators 72 and 74; and a force applied by index pin 66 on the pin end of the segment to keep that end close to or aligned with reference axis 79 in a sense of displacement from the reference axis. Rotation of the segment about index pin 66 is prevented initially by bridge 100. Dog 116 and head 112 clamping the pin end of the segment prevent rotation of the segment about index pin 66 after the bridge is removed.

The segment is located in space and relative to reference bed 58 by the surface of the saddle locating the gage row in elevation, jacks 74 and 72 and head 80 taking up all play axially and radially of the cutter journal, index pin 66 determining the elevation of the pin end of the segment from the bed, constraint block 64 and slide 82 determining the axial position of the segment with respect to the bed, and bridge 100 determining the angular position of the segment with respect to the index pin, which position is maintained by the clamp on the pin end of the segment.

After clamping the pin end and removal of bridge 100, the surfaces of the segment are finished, as by electro-chemical grinding. This step requires the V-slotted bridge to be removed, which may be done because the segment is fully clamped. Any final work on the segment is also done, such as the forming of an electron beam welding tooling hole.

Each of the bit segments is finished in this manner to bring their faying surfaces into the relationship necessary for cooperation with the faying surfaces of other bit segments to develop a full rock bit. The bit segments are brought together and clamped together as by a ring, and welded at their faying surfaces, as by electron beam welding.

The process of the present invention permits the taking up of all the tolerances that build up in the manufacturing process which can adversely affect the ability of the bit to perform as it is designed to do. The tolerances of the cone cutter on its journal are all taken up in such a manner as to simulate the loading on the cone occurring in the field. Inaccuracies because of the distortion from heat treatment and machining are eliminated by finishing the faying surfaces with the rock bit segment under the loads that will be experienced in the field.

The present invention was described with reference to a certain preferred embodiment. The spirit and scope of the appended claims should not, however, necessarily be limited to the foregoing description.

What is claimed is:

1. A method of accommodating tolerances developed in the fabrication of a rock bit segment of a multiple segment rock bit, each segment having a pin end, a leg, a journal extending from the leg and a cone cutter mounted on the journal for rotation about a rotational axis of the journal, the cone cutter having a gage diameter corresponding to the diameter of the rock bit and a gate point on the gage diameter where the cone cutter is to engage the side wall of a hole being drilled by the rock bit, the method comprising the steps of:
   (a) supporting the cone cutter at the gage point to establish a fixed position of the gage point with respect to a datum;
   (b) supporting the pin end of the segment to establish a fixed position of the pin end with respect to the datum;
   (c) loading the cone cutter with an axial force acting parallel to the axis of the journal and toward the leg;
   (d) loading the segment with a force acting parallel to the axis of the journal opposite the force on the cone cutter to establish equilibrium between such forces, whereby the tolerances between the cone cutter and the journal in a direction axially of the journal are taken up in the manner that such tolerances would be taken up by bearing on the bottom wall of a hole being drilled;
   (e) loading the cone cutter with a radial force acting normal to the axis of the journal and toward such axis at the gage point;
   (f) loading the journal with a force acting opposite the radial force to establish equilibrium, whereby the tolerances between the cone cutter and the journal in a direction radial of the axis of the journal and on a line through the gage point are taken up in the manner that such tolerances would be taken up by bearing on the side wall of a hole being drilled;
   (g) angularly orienting the segment by aligning preformed faying surfaces thereof with respect to the datum; and then
   (h) holding the segment fixed with respect to the datum with the loads applied; and then
   (i) finishing the faying surfaces to develop the required position of the included angle; and then
   (j) assembling the rock bit by welding the segments together along their faying surfaces.

2. The method claimed in claim 1 wherein the cone cutter is supported at the gage point by a saddle having a surface with a curvature substantially equal to the curvature of the gage row, such surface supporting the gage point.

3. The method claimed in claim 2 wherein the supporting of the pin end of the segment permits limited pitch, yaw, and rotation of the segment with respect to the support at the pin end.

4. The method claimed in claim 3 wherein the angle orientation of the segment includes gauging the preformed faying surfaces with a gauging block angularly fixed with respect to the datum.

5. The method claimed in claim 2 wherein the angle orientation of the segment includes gauging the preformed faying surfaces with a gauging block angularly fixed with respect to the datum.

6. The method claimed in claim 2 wherein the loading of the cone cutter with an axial force and with a radial force includes engaging the cone cutter with a slide to develop the axial load and applying the radial load at the gage point through the saddle.

7. The method claimed in claim 6 wherein the force acting parallel to the axis of the journal opposite the force on the cone cutter includes a force acting on the leg of the segment proximate the journal and in the direction parallel to the axis of the journal.

8. The method claimed in claim 7 wherein the loading of the segment with a force acting parallel to the axis of the journal includes loading the segment with jacks.

9. The method claimed in claim 7 wherein the loading of the segment with a force acting parallel to the axis of the journal includes engaging the pin end of the segment and applying a force axially of the segment by such engagement.

10. The method claimed in claim 9 including loading the segment with a force acting parallel to the axis of the journal by engaging the pin end with a block acting in partial opposition to the load applied on the segment on the cone cutter.

11. The method claimed in claim 9 wherein the force acting opposite the radial force and loading the journal is applied at least in part through the pin end of the segment.

12. A method for accommodating tolerances developed in the construction of a rock bit segment of a multi-segment rock bit, each segment comprising a pin end, a leg, a journal extending from the leg and a cone cutter mounted on the journal with the axis of the cutter offset from a rotary axis of the rock bit, the cone cutter having a gage diameter corresponding to the diameter of the rock bit and a gage point on the gage diameter where the cone cutter is to engage the cylindrical side wall of a hole being drilled by the rock bit, the method comprising the steps of:
   (a) assembling the cone cutter on the journal to develop a completed segment;
   (b) supporting the cone cutter on a cone saddle and establishing by such support the position of the gage diameter with respect to a predetermined datum;
   (c) supporting the pin end of the segment, the support of the pin end of the segment establishing the linear position of the pin end with respect to the predetermined datum;
   (d) axially loading the cone cutter and the segment in opposition along the axis of the journal to take up tolerances in this direction;
   (e) compressively loading the cone cutter at the gage point normal to the gage row diameter and loading the segment in opposition to such loading to take up tolerances between the cone cutter and the journal radially of the journal axis in the manner of a side wall of a hole being drilled by the rock bit bearing on the gage point;
   (f) angularly orienting the segment by aligning the preformed faying surfaces with respect to a predetermined datum; and then (g) holding the segment fixed with respect to the datums and with the loads applied; and then (h) finishing the faying surfaces to develop the position of the required included angle; and then (i) assembling the rock bit by attaching the segments at their faying surfaces.

13. The method claimed in claim 12 wherein the predetermined datum is a bed.

14. The method claimed in claim 13 wherein the cone saddle supports the cone cutter on a supporting surface of the saddle that has a curvature substantially equal to that of the gage diameter.

15. The method claimed in claim 14 wherein the axial and compressive loads are applied by a slide acting on the cutter and opposed by a block acting on the pin end of the segment and means acting normal to the axis of the journal on the segment apart from the cone cutter.

16. The method claimed in claim 12 wherein the cone saddle supports the cone cutter on a supporting surface of the saddle that has a curvature substantially equal to that of the gage diameter.

17. The method claimed in claim 16 wherein the axial and compressive loads are applied by a slide acting on the cutter and opposed by a block acting on the pin end of the segment and means acting normal to the axis of the journal on the segment apart from the cone cutter.

* * * * *